Jan. 13, 1970  J. W. SCHNELLER ET AL  3,488,904
SCREW-HOLDING FRANGIBLE BOARD

Filed March 6, 1968

INVENTORS
Joseph W. Schneller
BY Jack A. Dawdy

Robert F. Hause
ATTORNEY

INVENTORS
Joseph W. Schneller
BY Jack A. Dawdy

Robert F. Hause
ATTORNEY

United States Patent Office 3,488,904
Patented Jan. 13, 1970

3,488,904
SCREW-HOLDING FRANGIBLE BOARD
Joseph W. Schneller, Williamsville, and Jack A. Dawdy, Kenmore, N.Y., assignors to National Gypsum Company, Buffalo, N.Y., a corporation of Delaware
Filed Mar. 6, 1968, Ser. No. 710,805
Int. Cl. B04b 2/30, 2/72
U.S. Cl. 52—241                                    4 Claims

ABSTRACT OF THE DISCLOSURE

A thin sheet of metel, or the like, is laminated to the back side of a frangible board product, which without the metal would have substantially no screw-holding strength, but which with the metal is adapted to receive and firmly hold self-drilling, self-tapping metal screws. Preferably, a sandwich product is formed with a sheet metal center, and such, in narrow strips, provides light-weight, low-cost structural wall studs.

BACKGROUND

This invention relates to the field of screw-fastening of any desired product to another, such as a wall, wallboard, or a wall framing member. Normally, screw-fastening is limited to where the screw will extend into a wood stud or a form of metal stud adapted for receiving screws.

SUMMARY OF INVENTION

Briefly the present invention contemplates the lamination of a thin sheet of metal, or the like, to a frangible board product, whereby a self-drilling, self-tapping screw may be used to affix another product to this laminated board product.

It is an object of the invention to adapt low cost board products to receive and hold screws.

It is a further object to provide an inexpensive screw-holding stud.

It is a further object to provide means for screw attachment to relatively frangible board products.

These and other objects and advantages of the invention will be more readily apparent when considered in relation to the preferred embodiments as set forth in the specification and shown in the drawings in which.

Figure 1:
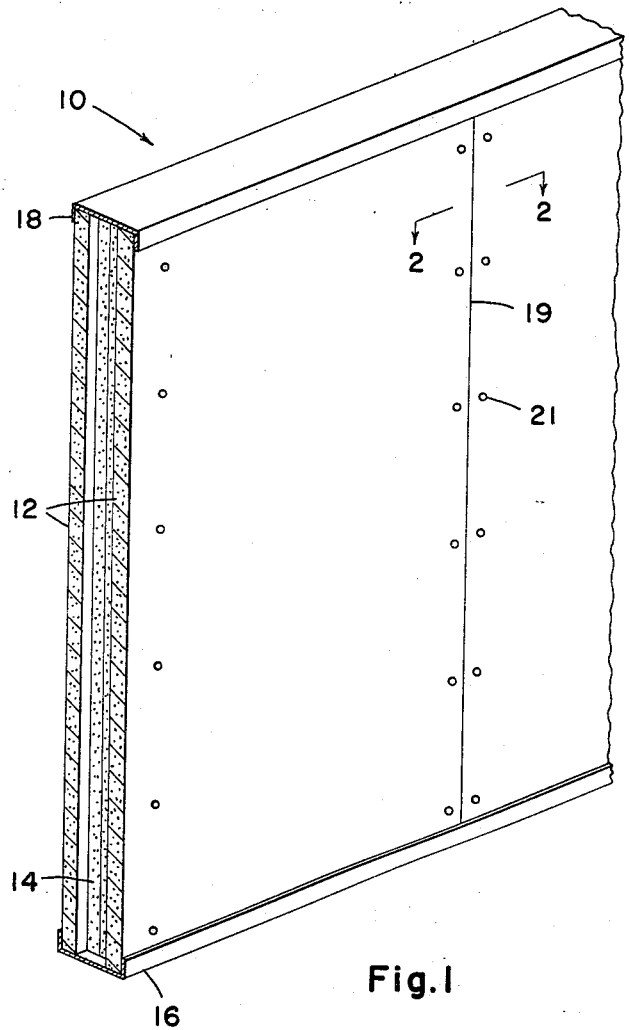
FIG. 1 is a perspective view of a hollow partition having a laminated screwable stud embodying the present invention.

Referring to FIG. 1 there is shown a hollow partition 10 including wallboards 12 on each side, connected by laminated studs 14 therebetween, all mounted within a floor track 16 and a ceiling track 18. Abutting wallboard edges form therebetween a joint 19.

Figure 2:
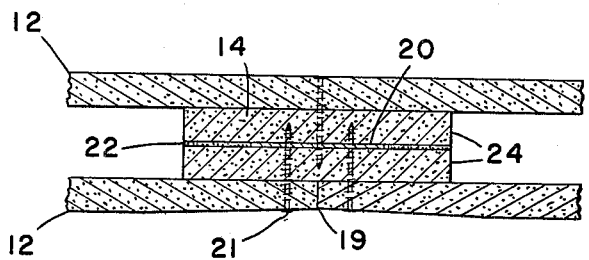
FIG. 2 is a sectional view of the partition of FIG. 1 taken along line 2—2.

FIG. 2 is a cross-section of partition 10, showing the laminated stud 14 to consist of a thin, narrow elongate metal strip 20 of a suitable thickness for penetration by self-drilling, self-tapping drywall screws 21 and for firm holding of such screws 21 once threaded therein to, said strip 20 being embedded within a layer of adhesive 22, all sandwiched between two somewhat wider elongate paper-covered gypsum board strips 24, 24.

Laminated studs 14 would preferably be factory-assembled, using about four inch wide, paper-covered gypsum board strips 24, made by cutting gypsum boards of size 4 ft. x 8 ft., 4 ft. x 10 ft. or 4 ft. x 12 ft., into strips of about 4 inch x 8 ft., 4 inch x 10 ft. or 4 inch x 12 ft.

Thin metal strip 20 are preferably about .020 to .040 inch thick, from about one inch to almost the gypsum board strip width and equal in length to the length of the gypsum board strip with which it is to be combined.

Any form of adhesive 22 suitable for bonding paper firmly together may be employed, and preferably one should be used which would provide a reasonably strong bond to the metal strip 20 also. For example, a suitable adhesive is a synthetic rubber resin emulsion, such as adhesive #777 of the H. B. Fuller Company.

Figure 3:
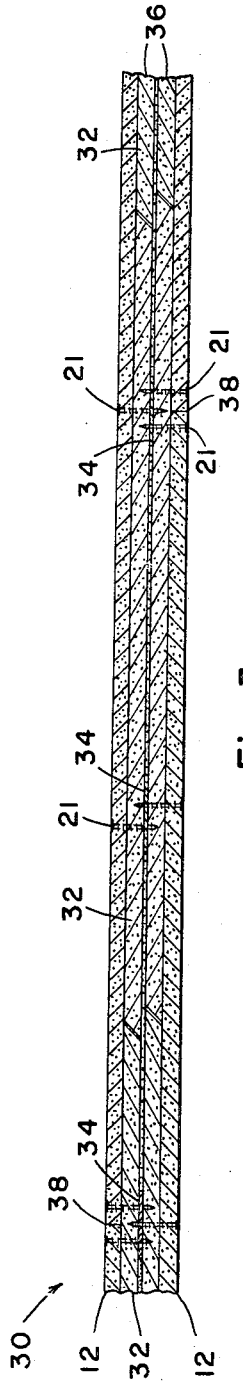
FIGS. 3, 4 and 5 are sectional views similar to the view of FIG. 2 of three modified, solid partitions also embodying the present invention.

In FIG. 3, a modified form of the invention is shown, wherein a solid partition 30 includes a solid, laminated core-board 32 and an outer facing of wallboards 12. Core-board 32 is, for example, formed similar to the interlocking core-boards disclosed in U.S. Patent 2,884,779, with the further inclusion of thin metal strips 34 between the two gypsum board plies 36 which form the core-board 32. Strips 34 are preferably about .020 to .040 inch thick and about one to four inches wide, extending the full length of the core-board 32. Two strips 34 each two inches wide are shown adhesively laminated between the plies 36 of each two foot nominal width core-board 32, the strips 34 being centered about six inches inward from each of the two side edges.

Erection of the solid partition 30 consists of mounting the core-boards 32 in suitable floor and ceiling tracks, and affixing four foot wide gypsum boards 12 to the two faces by self-drilling, self-tapping drywall screws 21, screwed into the metal strips 34. To assist a builder in positioning screws 21 to penetrate metal strips 34, the outer faces of core-boards 32 may be suitably marked along the extent of the strip 34. The wallboards 12 are disposed with vertical joints 38 aligned with the center of the metal strips 34, whereby screws 21 may be located closely adjacent the edges of each of the two wallboards and extend through a common metal strip 34. The vertical joint 38 on one side of the partition is preferably displaced from the joint 38 on the opposite side by a distance equal to half a wallboard 12 width.

Figure 4:
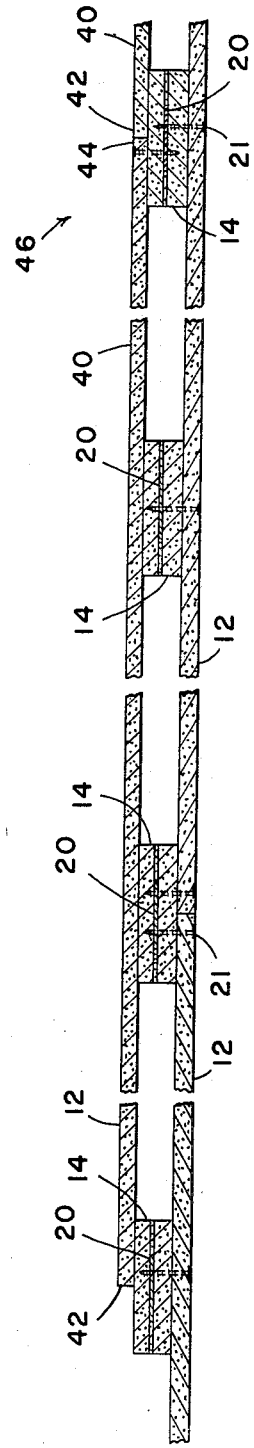

FIG. 4 shows a further modification of the invention wherein preassembled panels 40 are factory fabricated by adhesively affixing three laminated studs 14 to the back face of a wallboard 12. One laminated stud 14 is adhered in overlapping relation to one side edge 42 of wallboard 12 and the other two studs 14 are adhered in spaced parallel relationship at respectively ⅓ board width and ⅔ board width therefrom. The opposite side edge 44 is then disposed in overlapped relation onto the laminated stud 14 adhered in overlapping relationship to the side edge 42 of an adjacent panel 40.

A panellized partition 46 is thus constructed by forming one complete face of the portion of panels 40, each with an edge 44 abutting the edge 42 of an adjacent panel and with self-drilling, self-tapping drywall screws 21 screwed through the edge 44 of each panel into the metal strip 20 of the laminated stud 14 at the edge 42 of the adjacent panel 40. Plain wallboards 12 are then attached by screws 21 to the laminated studs 14, providing the opposite face of the panellized partition 46.

Figure 5:
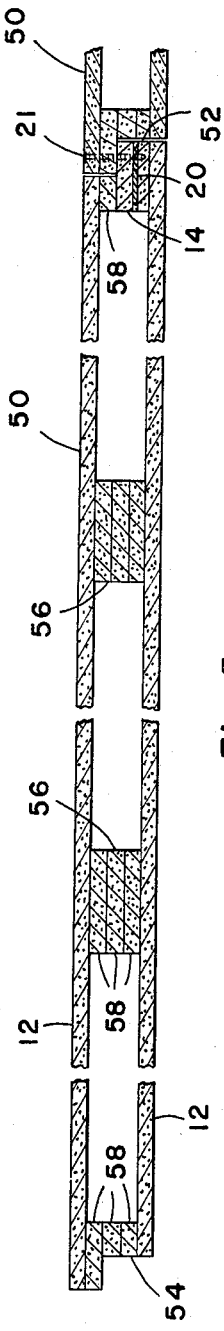

FIG. 5 shows another form of preassembled panel 50, wherein one laminated stud 14 is incorporated therein. Panel 50 has one edge portion 52 which has incorporated therein the stud 14 and has an opposite edge portion 54 complementary in edge shape to the edge shape of edge portion 52. In the preferred form shown the panel 50 includes two wallboards 12, 12 spaced apart by two laminated units 56, each consisting of three spacers 58, which spacers are narrow elongate strips of paper-covered gypsum board, generally similar to the strips of gypsum board used in forming studs 14.

At edge portion 52 a single spacer 58 is combined with stud 14 in between the edges of the two wallboards 12. The two wallboards are of equal width and are posed with edges lapped relative one to another, with stud 14 and the wallboard to which it is adhered directly extending outwardly further than the edge of the posite wallboard and the spacer which is adhered directly to the edge of the opposite wallboard. Accordingly, opposite edge portion 54 includes three spacers 58 minated between the edges of the wallboard with one llboard edge and one spacer to which it is adhered ectly extending outwardly further than the edge of the posite wallboard and the other two spacers.

Having completed a detailed disclosure of the prered embodiments of our invention, so that others may actice the same, we contemplate that variations may be de without departing from the essence of the invenn.

We claim:

1. A laminated stud for screw attachment of sheets of ilding boards to two faces thereof, comprising two ongate narrow strips of paper covered gypsum board d a narrower strip of sheet metal disposed between said psum board strips, said gypsum board strips having ual widths of from about two to four inches, said psum board strips and said metal strip being laminated form a three ply stud having said equal width gypsum ard strip edges substantially alined one with the other d the narrower metal strip edges spaced inwardly substantially an equal distance at each edge from the gypsum ard strip edges, said edges portions of said two gypsum ard strips being directly adhered to one another with lhesive throughout the portions of said gypsum board ips which are outward of the edges of said metal strips.

2. A laminated stud as defined in claim 1 wherein said metal strip is completely embedded within a layer of adhesive and said layer of adhesive is sandwiched between gypsum board strips and disposed completely throughout the area between said gypsum board strips.

3. A hollow partition consisting essentially of a plurality of vertical studs as defined in claim 1 and a plurality of sheets of wallboard attached to both faces of said studs solely by screws, said screws each extending through a sheet of wallboard, one of said stud gypsum board strips, said metal strip and at least part way through the other said gypsum board strip of said stud.

4. A building structure comprising a hollow partition as defined in claim 3, a floor track and a ceiling track, said partition having bottom and top edges disposed respectively within said floor track and said ceiling track.

References Cited

UNITED STATES PATENTS

| | | | |
|---|---|---|---|
| 1,486,113 | 3/1924 | Baxter et al. | 52—621 |
| 2,075,773 | 3/1937 | Vass | 52—593 X |
| 2,242,834 | 5/1941 | Price | 52—344 |
| 2,249,590 | 7/1941 | Allen | 52—404 X |
| 2,361,733 | 10/1944 | Bartholomew | 52—620 X |
| 2,797,573 | 7/1957 | Hummer | 52—593 X |
| 2,884,779 | 5/1959 | Buergin et al. | 52—241 X |
| 3,300,933 | 1/1967 | Donahue | 52—368 |
| 3,336,710 | 8/1967 | Raynes | 52—621 X |

ALFRED C. PERHAM, Primary Examiner

U.S. Cl. X.R.

52—376, 481, 593, 621; 161—213